Patented Dec. 8, 1931

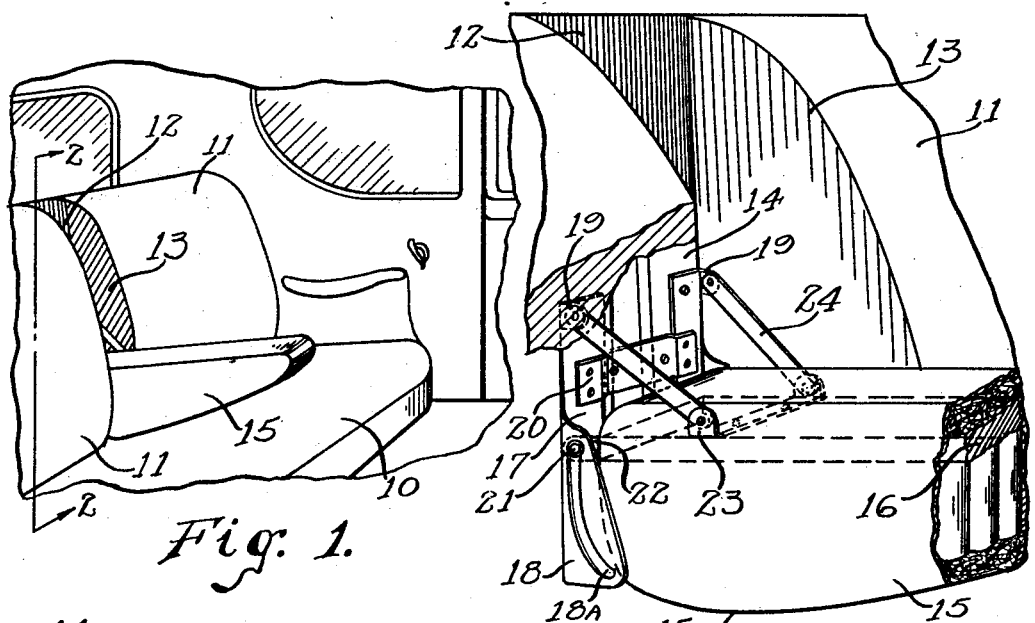
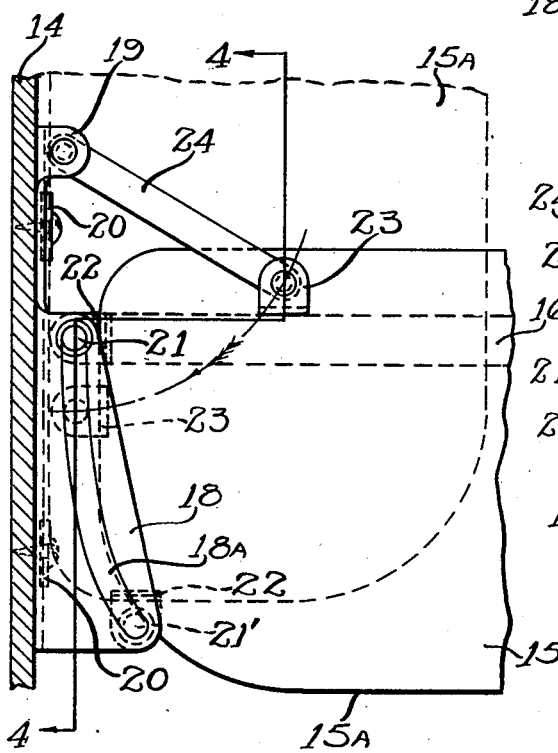
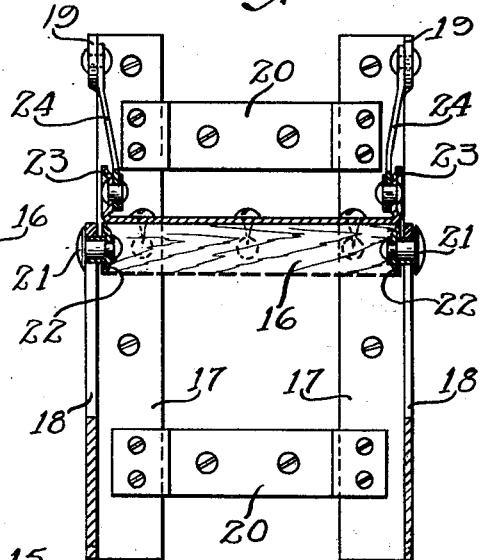

1,835,947

UNITED STATES PATENT OFFICE

UDO JOHANNSEN, OF BINGHAMTON, NEW YORK, ASSIGNOR TO THE BREWER-TITCHENER CORPORATION, OF CORTLAND, NEW YORK, A CORPORATION OF NEW YORK

VEHICLE SEAT ARM

Application filed May 16, 1929. Serial No. 363,580.

This invention relates to an arm rest of the disappearing type as applied to vehicle seats, and more particularly provides for a seat accessory associated with a suitable receiving pocket preferably but not necessarily formed in the upholstered back of an automobile body seat. My device may be pivotally mounted to fold into an upright flush and concealed relation with respect to the upholstered front face of the seat back; when needed, said arm may readily be thrown down into its overhanging operative position intermediate the seat ends to serve as a convenient arm rest for the occupants seated at either side thereof.

The object of my improvements is to provide for an effective and durable appurtenance of this character that will afford ample lateral rigidity and obviate rattle because of wear in the pivot joints; also to provide for simple body hardware capable of being economically manufactured and applied as a unit to new equipment without necessitating any radical changes in the prevailing structure of conventional automobile seats. To this end and the accomplishment of other new and useful results, said invention further consists in novel structural features, all of which will hereinafter be fully set forth.

Reference is had to the accompanying one sheet of drawings which are illustrative of a specific embodiment of my invention particularly as applied to automotive purposes, in which like characters of reference indicate like parts, and in which:

Fig. 1 represents a fragmentary perspective interior view of an automobile body seat equipt with my improvements.

Fig. 2 is a detailed elevational view showing the arm rest actuating linkage as taken in perspective along line 2—2 of Fig. 1.

Fig. 3 shows a partial side view outline indicating the linkage movement between the respective extreme swing positions of the arm rest.

Fig. 4 is a partial transverse sectional view of my arm mechanism as taken along line 4—4 of Fig. 3.

Referring first to Fig. 1, this illustrates certain conventional motor car seat elements that are likely to be indirectly associated with my arm rest devices, namely a transversely disposed seat 10, an upholstered back 11 therefore which is shown provided with a slotted recess or inset pocket 12 as formed in the upholstery between spaced complementary side walls thereof, such as 13. The back upholstery is usually attached to a rear wooden frame work 14 to which my arm linkage is preferably secured.

The arm proper, designated in its entirety as 15, may be fashioned in any suitable manner but as applied to fine motor cars, preferably comprises an elongated stiffening or girder board 16 which may be upholstered or otherwise trimmed to give a longitudinally puffed parabolic shape thereto having opposite flat sides adapted to fit snugly between the similarly shaped pocket side-walls 13 in the conventional manner.

The rearward end of the arm 15 is pivotally guided and arranged to fold up into the pocket 12 when not in use. My improved linkage permitting of such folding and of unfolding said arm into operative extended position, is clearly indicated in Fig. 2, and may comprise complementary angular sheetmetal bracket members such as 17, each having an outwardly turned side flange 18 that is arcuately slotted or grooved at 18A in a peculiar manner that will hereinafter be more explicitly described; said bracket may further be provided with an upstanding pivot ear 19 disposed above said flange and in substantial vertical alignment therewith. These vertical flanges are oppositely disposed and spaced to snugly receive the rear end portion of the movable rest arm therebetween. Said bracket members are shown as interconnected by struts 20 to constitute a unitary structure adapted to be fixedly attached to the body frame work 14 by wood screws or the like.

The opposite flat side faces of said arm are each equipt with an overhanging roller pin 21 respectively arranged to run in one of the slotted grooves 18A. Fig. 2 shows said rollers as carried by extension straps such as 22, secured to the rearward end of the girder 16. As disclosed in dotted outline, the upper face of said girder may further be equipt with a pair of spaced perforated lugs 23 which may be tied together. Said lugs are in turn, each pivotally connected to a separate guide or retaining link 24 as fulcrumed to one of the respective bracket ears 19 in the straddled manner represented in Fig. 2.

Assuming the arm 15 to be extended horizontally into its operative or full lined relation that is shown in Fig. 3, the roller pins 21 reach their uppermost stop positions in their respective slots 18A, while the complementary guide links 24 will then extend forwardly of their respective top fulcrum ears 19. Should the free swingable end of the arm 15 now be tilted upwardly toward its folded position, the outermost swinging end of the respective links 24 will then drop in the direction of the arrow, thus carrying the lugs 23 into close adjacency to the body framework as indicated in Fig. 3 by dotted outline; the roller pins 21 will at the same time drop along their respective slots or grooves and finally bottom in their lowermost position designated as 21'. The forward face contour given to the arm is preferably such that when folded out of the way into its concealed position, the upholstered arm profile 15A will fall into flush registry with that of the seat back 11.

The linkages 19—23 and 23—21 are arranged to provide for a toggle effect; by making the sum of these link pin distance somewhat greater than the direct span length between the pins 19 and 21', said toggle must be thrust through its aligned link or dead-center position when the arm rest approaches its completely folded position. Thereupon the upturned arm will be automatically retained in place notwithstanding that the overhung arm weight tends to drop back into operative position. It is preferred to direct the lowermost arcuate slot end well forward of the vertical support wall 14 since this in turn controls the effectiveness of the cited toggle counterbalancing action.

As will be obvious, said folded arm may readily and quickly be dropped into operative or extended position when so desired by a seat occupant. The finished appearance of my device is such that it will not mar the trim of the body interior, the entire arm mechanism being kept neatly concealed within the confines of the pocket 12. It is further pointed out that my guide linkage imparts ample sidewise rigidity to the overhanging arm; in addition, the medially disposed arm lugs 23 together with the supporting links 24 therefor, serve as laterally spaced fulcrums about which the rollers 21 are made to interlock with the respective top ends of the slots 18A in order to adequately resist any downward thrust that may be imposed upon the overhanging free end of my unfolded rest arm.

It is to be understood that the described appurtenances also find application to other than the cited automotive rear seats, and that various changes in the details and mode of installation thereof may be resorted to in likewise carrying out my illustrative embodiment, all without departing from the spirit and scope of my invention, heretofore described and more particularly pointed out in the appended claims.

I claim:

1. In a vehicle seat provided with a vertically pocketed back member, a tiltable arm adapted to be folded upwardly into said pocket and to swing outwardly therefrom into extended unfolded position, guidepin means associated with the restrained end of said arm, flange means carried by said back including vertically disposed groove means slidably cooperating with said pin means, the lowermost groove end being set outwardly away from the back relative to the upper groove end and disposed to have said guide pin bottom thereon when said arm is raised into folded position, and link means pivotally inter-connecting said back and an adjacent end portion of the arm, the respective link pivots being so disposed that when said arm is brought into folded relation, one such pivot is sprung through its dead-center path position defined when said pivot reaches toggle-like alignment between the bottomed guide-pin and the other of said pivots.

2. In a vehicle seat comprising a vertical back having a framework whose forward face is provided with an upholstered arm receiving pocket intermediate the seat ends, the combination of a pair of laterally spaced ears disposed within said pocket and carried by said framework in a forwardly extending relation thereto, a pair of spaced vertical side-flange members likewise carried by said framework and respectively disposed beneath and in substantial outstanding alignment with said ears, said flanges each being respectively provided with an obliquely disposed guide slot of which the lowermost end region extends forwardly beyond the aforesaid ear extension, a forwardly overhung arm-rest of which one end is pivotally mounted between said flanges to swing upwardly into and downwardly out of said pocket, and a linkage of the toggle type serving to guide the arm rest into and out of folded position, said linkage including laterally spaced fulcrums carried by the arm, a pair of guide pins slidably disposed within the respective slots, and link means respectively interconnecting said ears with said fulcrums and which linkage somewhat prior to allowing said arm to reach folded position, is arranged to bottom each pin against the lowermost end of its slot and thereby require the fulcrum cooperating therewith to be sprung through a critical toggle position in which the last named fulcrum, ear and pin assume alignment and rearwardly beyond which position the forwardly overhung portion of said folded arm is restrainedly upheld against falling out of said pocket and the hindmost arm portion is kept in stabilized close adjacency with said framework.

In testimony whereof, I have herewith set my hand this 14th day of May, 1929.

UDO JOHANNSEN.